(12) United States Patent
You et al.

(10) Patent No.: US 9,722,953 B2
(45) Date of Patent: Aug. 1, 2017

(54) BNG-POOL-BASED RESPONSE METHOD, SYSTEM AND RELATED DEVICE

(71) Applicant: ZTE Corporation, Shenzhen, Guangdong (CN)

(72) Inventors: Jianjie You, Shenzhen (CN); Huaibin Wang, Shenzhen (CN); Liang Fan, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 99 days.

(21) Appl. No.: 14/437,559

(22) PCT Filed: Aug. 26, 2013

(86) PCT No.: PCT/CN2013/082302
§ 371 (c)(1),
(2) Date: Apr. 22, 2015

(87) PCT Pub. No.: WO2014/063527
PCT Pub. Date: May 1, 2014

(65) Prior Publication Data
US 2015/0304246 A1    Oct. 22, 2015

(30) Foreign Application Priority Data
Oct. 24, 2012  (CN) .......................... 2012 1 0410054

(51) Int. Cl.
*H04L 12/28*   (2006.01)
*H04L 12/931*  (2013.01)
(Continued)

(52) U.S. Cl.
CPC ............ *H04L 49/201* (2013.01); *H04L 49/25* (2013.01); *H04W 12/08* (2013.01); *H04W 48/08* (2013.01);
(Continued)

(58) Field of Classification Search
CPC ...... H04L 49/201; H04L 49/25; H04W 12/08; H04W 48/08; H04W 74/004; H04W 74/006; H04W 88/16
See application file for complete search history.

(56) References Cited

U.S. PATENT DOCUMENTS 8,499,093 B2 * 7/2013 Grosser ................ H04L 61/103
370/392
2009/0154478 A1   6/2009 Sridhar
(Continued)

FOREIGN PATENT DOCUMENTS

CN    101369909 A    2/2009
CN    102378304 A    3/2012

OTHER PUBLICATIONS

International Search Report in international application No. PCT/CN2013/082302, mailed on Nov. 14, 2013.
(Continued)

*Primary Examiner* — Kan Yuen
(74) *Attorney, Agent, or Firm* — Oppedahl Patent Law Firm LLC

(57) ABSTRACT

A Broadband Network Gateway (BNG) pool based responding method is described, including that a BNG device in the BNG pool receives a user access request, and the BNG device responds according to the user access request and a delayed response strategy corresponding to the BNG device. A BNG device, a user equipment and a BNG pool based responding system are also described. Thus a BNG device in a BNG pool can respond to a user access request according to a delayed response strategy, then a user equipment can take a BNG device corresponding to a first response message received as a server, thereby being capable of ensuring system stability.

10 Claims, 2 Drawing Sheets

(51) Int. Cl.
    *H04W 48/08*     (2009.01)
    *H04L 12/947*     (2013.01)
    *H04W 12/08*     (2009.01)
    *H04W 74/00*     (2009.01)
    *H04W 88/16*     (2009.01)

(52) U.S. Cl.
    CPC ........ *H04W 74/004* (2013.01); *H04W 74/006* (2013.01); *H04W 88/16* (2013.01)

(56) References Cited

U.S. PATENT DOCUMENTS

| | | | |
|---|---|---|---|
| 2010/0131660 A1* | 5/2010 | Dec | .................... H04L 41/0806 709/228 |
| 2011/0170555 A1* | 7/2011 | Miyata | .................... H04L 12/66 370/401 |
| 2011/0173678 A1 | 7/2011 | Kaippallimalil | |
| 2012/0198096 A1 | 8/2012 | Leng | |
| 2012/0263041 A1 | 10/2012 | Giaretta | |
| 2014/0325039 A1 | 10/2014 | Dec et al. | |

OTHER PUBLICATIONS

English Translation of the Written Opinion of the International Search Authority in international application No. PCT/CN2013/082302, mailed on Nov. 14, 2013.
Supplementary European Search Report in European application No. 13849245.9, mailed on Nov. 9, 2015.

* cited by examiner

BNG-POOL-BASED RESPONSE METHOD, SYSTEM AND RELATED DEVICE

TECHNICAL FIELD

The disclosure relates to the field of communications, and in particular to a Broadband Network Gateway (BNG) pool based responding method, system and related device.

BACKGROUND

A Broadband Remote Access Server (BRAS)/Broadband Network Access Server (BNAS) supports broadband services such as high speed Internet services, VoIP services, IP video services, personal/corporate Virtual Private Network (VPN) services and the like. In order to guarantee high reliability of these services, it is required to employ a backup mechanism of a BNG device.

At present, in order to provide a protection mechanism among a large number of devices and guarantee high reliability of high volume services, there has been proposed a concept of BNG pool/BNG cloud. A BNG pool consists of multiple BNG devices, and mechanisms such as load sharing and backup protection are implemented within the BNG pool.

However, there is no solution which enables BNG devices in a BNG pool can respond to a user access request in the prior art.

SUMMARY

In view of the above, embodiments of the disclosure are intended to provide a BNG pool based responding method, system and related device, by which a BNG device in the BNG pool can respond to a user access request, and system stability can be ensured.

To this end, the technical solutions of embodiments of the disclosure are implemented as follows.

A BNG pool based responding method, including that a BNG device in the BNG pool receives a user access request, and the BNG device responds according to the user access request and a delayed response strategy corresponding to the BNG device.

In an embodiment, a user access port of the BNG device in the BNG pool may be arranged in a layer 2 broadcast domain, and the user access request received by the BNG device may be broadcast, through the layer 2 broadcast domain, to all BNG devices in the BNG pool; and the step that a BNG device in the BNG pool receives a user access request may include that a user access request broadcast by the BNG pool is received.

In an embodiment, the method may further include that a strategy configuration device configures the BNG device in the BNG pool with a delayed response strategy initiatively or upon a request from the BNG device, wherein the delayed response strategy is determined based on at least one of following information: a user access status of the BNG device, a bandwidth utilization status or a characteristic value of a user which requests access.

In an embodiment, the characteristic value of the user which requests access may include at least one of following information: a Media Access Control (MAC) address, a Virtual Local Area Network (VLAN) or a user identifier.

In an embodiment, the step that the BNG device responds according to the user access request and a delayed response strategy corresponding to the BNG device may include: the BNG device acquires, according to the user access request, at least one of following information: an MAC address modulo result of the user, a range of VLAN identifiers of the user, or a domain where the user is located; and the BNG device queries for the delayed response strategy according to acquired information, and responds according to a query result.

In an embodiment, the method may further include that a user equipment determines a BNG device corresponding to a first response received as a server, and drops responses from other BNG devices.

A BNG device, being a BNG device in a BNG pool, includes a first reception module, a delayed response strategy storage module and a responding module; specifically, the first reception module is configured to receive a user access request; the delayed response strategy storage module is configured to store a delayed response strategy corresponding to the BNG device; and the responding module is configured to respond according to the user access request received by the first reception module and the delayed response strategy corresponding to the BNG device stored by the delayed response strategy storage module.

In an embodiment, the first reception module may be configured to receive a user access request broadcast by the BNG pool through a layer 2 broadcast domain.

In an embodiment, the delayed response strategy storage module may be configured to store the delayed response strategy configured for the BNG device by a strategy configuration device initiatively or upon a request from the BNG device, wherein the delayed response strategy is determined based on at least one of a user access status of the BNG device, a bandwidth utilization status or a characteristic value of a user which requests access.

In an embodiment, the responding module may be configured to acquire, according to the user access request, at least one of following information: an MAC address modulo result of the user, a range of VLAN identifiers of the user, or a domain where the user is located; and then configured to query for the delayed response strategy according to acquired information, and respond according to a query result.

A user equipment includes a transmission module, a second reception module and a server determination module; specifically, the transmission module is configured to transmit a user access request to a BNG pool; the second reception module is configured to receive a response from a BNG device in the BNG pool; and the server determination module is configured to determine a BNG device corresponding to a first response received by the second reception module as a server, and drop responses from other BNG devices.

A BNG pool based responding system includes at least one BNG device, a strategy configuration device and a user equipment; specifically, the BNG device is the BNG device as described above; the user equipment is the user equipment as described above; and the strategy configuration device is configured to configure the BNG device with a delayed response strategy initiatively or upon a request from the BNG device, wherein the delayed response strategy is determined based on at least one of following information: a user access status of the BNG device, a bandwidth utilization status or a characteristic value of a user which requests access.

In the BNG pool based responding method, system and related device according to embodiments of the disclosure, a BNG device in the BNG pool receives a user access request; and the BNG device responds according to the user access request and a delayed response strategy corresponding to the BNG device. By means of the embodiments of the disclosure, a BNG device in a BNG pool responds to a user access request according to a delayed response strategy, then a user equipment can take a BNG device corresponding to a first response message received as a server, thereby being capable of ensuring system stability.

DETAILED DESCRIPTION

In an embodiment of the disclosure, a BNG device in the BNG pool receives a user access request; and the BNG device responds according to the user access request and a delayed response strategy corresponding to the BNG device.

Figure 1:
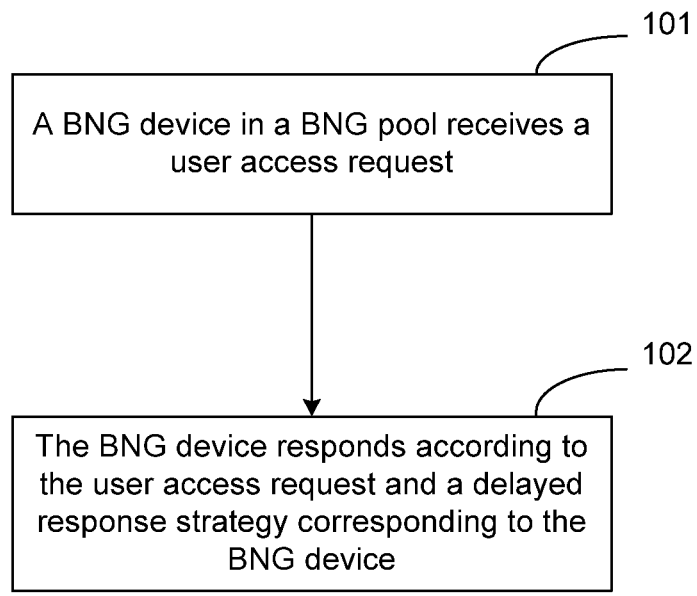
FIG. 1 is a schematic flowchart of a BNG pool based responding method according to an embodiment of the disclosure.

An embodiment of the disclosure provides a BNG pool based responding method, as shown in FIG. 1, the method includes:

step 101, a BNG device in the BNG pool receives a user access request; and step 102, the BNG device responds according to the user access request and a delayed response strategy corresponding to the BNG device.

Optionally, a user access port of the BNG device in the BNG pool may be arranged in a layer 2 broadcast domain, and the user access request received by the BNG device may be broadcast, through the layer 2 broadcast domain, to all BNG devices in the BNG pool; and the step that a BNG device in the BNG pool receives a user access request may include that a user access request broadcast by the BNG pool is received.

Optionally, the method may further include that a strategy configuration device configures the BNG device in the BNG pool with a delayed response strategy initiatively or upon a request from the BNG device, wherein the delayed response strategy is determined based on at least one of a user access status of the BNG device, a bandwidth utilization status or a characteristic value of a user which requests access.

It should be noted that the strategy configuration device may be a strategy server, and may also be any other management server.

Optionally, the characteristic value of the user which requests access may include at least one of following information: an MAC address, a VLAN identifier or a user identifier.

Optionally, the step that the BNG device responds according to the user access request and a delayed response strategy corresponding to the BNG device may include:

the BNG device acquires, according to the user access request, at least one of: an MAC address modulo result of the user, a range of VLAN identifiers of the user, or a domain where the user is located; and the BNG device queries for the delayed response strategy according to acquired information, and responds according to a query result.

Optionally, the method may further include that a user equipment determines a BNG device corresponding to a first response received as a server, and drops responses from other BNG devices.

Figure 2:
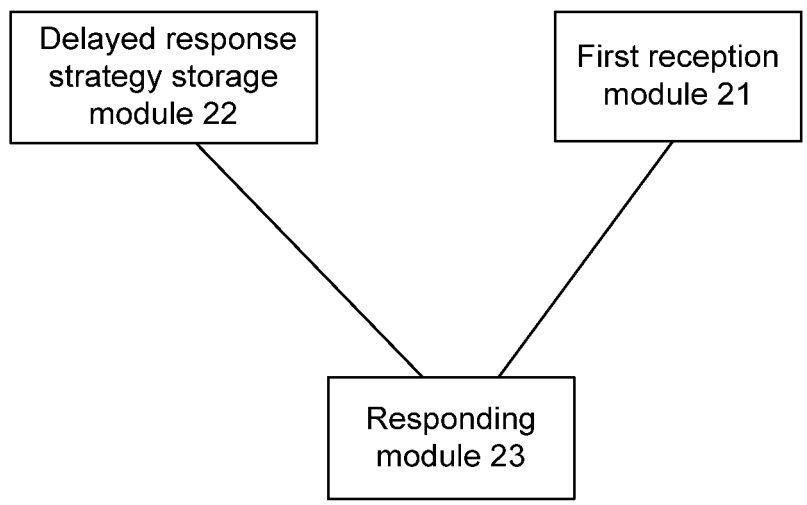
FIG. 2 is a schematic structural diagram of a BNG device according to an embodiment of the disclosure.

An embodiment of the disclosure further provides correspondingly a BNG device, which is a BNG device in a BNG pool, and as shown in FIG. 2, the BNG device includes a first reception module 21, a delayed response strategy storage module 22 and a responding module 23;

specifically, the first reception module 21 is configured to receive a user access request;

the delayed response strategy storage module 22 is configured to store a delayed response strategy corresponding to the BNG device; and the responding module 23 is configured to respond according to the user access request received by the first reception module 21 and the delayed response strategy corresponding to the BNG device stored by the delayed response strategy storage module 22.

Optionally, the first reception module 21 may be configured to receive a user access request broadcast by the BNG pool through a layer 2 broadcast domain.

Optionally, the delayed response strategy storage module 22 may be configured to store the delayed response strategy configured for the BNG device by a strategy configuration device initiatively or upon a request from the BNG device, wherein the delayed response strategy is determined based on at least one of a user access status of the BNG device, a bandwidth utilization status or a characteristic value of a user which requests access.

Optionally, the responding module 23 may be configured to acquire, according to the user access request, at least one of following information: an MAC address modulo result of the user, a range of VLAN identifiers of the user, or a domain where the user is located; and then configured to query for the delayed response strategy according to acquired information, and respond according to a query result.

In practical applications, the first reception module can be implemented by a transceiver in the BNG device; the delayed response strategy storage module and the responding module can be implemented by a Central Processing Unit (CPU), a Digital Signal Processor (DSP) or a Field Programmable Gate Array (FPGA) in the BNG device.

Figure 3:
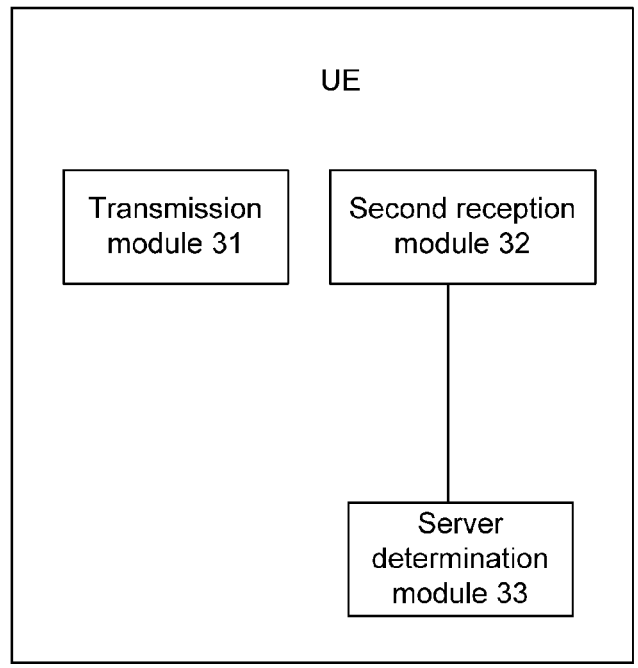
FIG. 3 is a schematic structural diagram of a UE according to an embodiment of the disclosure.

An embodiment of the disclosure further provides a user equipment, and as shown in FIG. 3, the user equipment includes a transmission module 31, a second reception module 32 and a server determination module 33;

specifically, the transmission module 31 is configured to transmit a user access request to a BNG pool;

the second reception module 32 is configured to receive a response from a BNG device in the BNG pool; and the server determination module 33 is configured to determine a BNG device corresponding to a first response received by the second reception module as a server, and drop responses from other BNG devices.

In practical applications, the transmission module and the second reception module can be implemented by a transceiver in the BNG device; the server determination module can be implemented by a Central Processing Unit (CPU), a Digital Signal Processor (DSP) or a Field-Programmable Gate Array (FPGA) in the BNG device.

Figure 4:
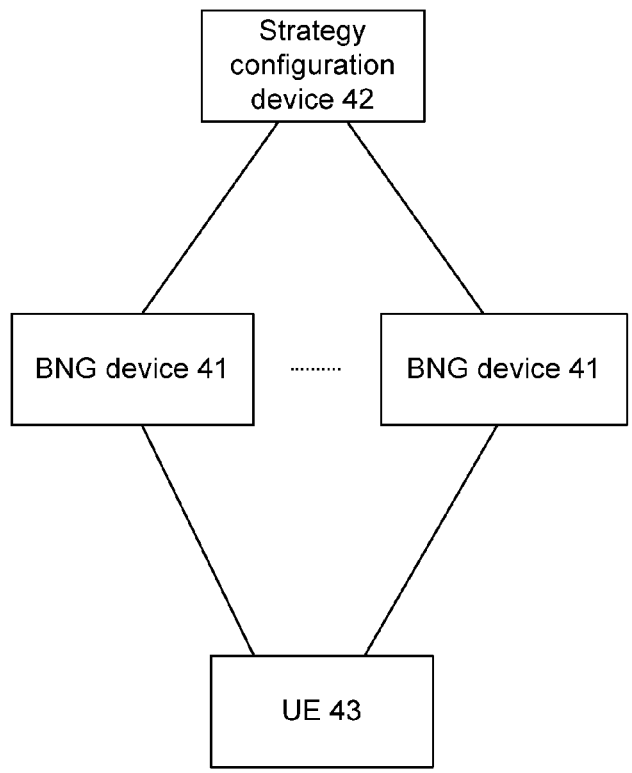
FIG. 4 is a schematic structural diagram of a BNG pool based responding system according to an embodiment of the disclosure.

An embodiment of the disclosure further provides a BNG pool based responding system, as shown in FIG. 4, the system includes at least one BNG device 41, a strategy configuration device 42 and a user equipment 43;

specifically, the BNG device 41 is the BNG device as described above;

the user equipment 43 is the user equipment as described above; and the strategy configuration device 42 is configured to configure the BNG device 41 with a delayed response strategy initiatively or upon a request from the BNG device 41, wherein the delayed response strategy is determined based on at least one of following information: a user access status of the BNG device, a bandwidth utilization status, or a characteristic value of a user which requests access.

The disclosure will be elaborated below with reference to accompanying drawings and specific embodiments.

Embodiment 1

This embodiment introduces a process for configuring a delayed response strategy for a BNG device in a BNG pool. The process is specifically described as follows.

A strategy configuration device configures the BNG device in the BNG pool with the delayed response strategy initiatively or upon a request from the BNG device, and the configuration can be performed in three ways as follows.

1) The delayed response strategy is configured based on identifiers of users. The identifiers of the users contain information of domains to which respective users are attributed; devices in the BNG pool are configured with different delayed response time depending on the user domains; it is assumed that there are three BNG devices in the BNG pool, and each BNG device is configured with different delayed response time depending on user domains. As shown in below table, a BNG A has a delayed response time of 0 with respect to a domain D1, a BNG B has a delayed response time of 50 ms with respect to the domain D1, and a BNG C has a delayed response time of 100 ms with respect to the domain D1. After a user access request is broadcast to user access ports of the BNG A, the BNG B and the BNG C, the BNG A responds immediately, the BNG B responds after a delay of 50 ms and the BNG C responds after a delay of 100 ms. A user in the domain D1 receives first a response request from the BNG A, then the user selects D1 as its server. As to D2 and D3, the similar user mechanism applies. By means of such a domain based responding mechanism, the user of D1 accesses to the BNG A. A user of D2 accesses to the BNG B, and a user of D3 accesses to the BNG C. Thus, it is possible to achieve an effect that the BNG pool shares loads of users according to user domains.

The delayed response strategy configured according to user identifiers can be shown in Table 1.

TABLE 1

| Domain name | BNG A Delayed response time (ms) | BNG B Delayed response time (ms) | BNG C Delayed response time (ms) |
| --- | --- | --- | --- |
| D1 | 0 | 50 | 100 |
| D2 | 50 | 100 | 0 |
| D3 | 100 | 0 | 50 |

2) The delayed response strategy is configured based on MAC addresses of users. Specifically, the delayed response strategy can be configured according to MAC address modulo results of the users, an example is shown in below table: if there are three categories of BNG devices, that is, a divisor is set to 3, then remainders resulted from MAC address modulo are (0, 1, 2), then the delayed response time of respective BNG devices are configured according to the remainders.

The configuration of the delayed response based on MAC addresses of users can be shown in Table 2.

TABLE 2

| MAC address modulo (remainder) | BNG A Delayed response time (ms) | BNG B Delayed response time (ms) | BNG C Delayed response time (ms) |
| --- | --- | --- | --- |
| 0 | 0 | 50 | 100 |
| 1 | 50 | 100 | 0 |
| 2 | 100 | 0 | 50 |

3) The delayed response strategy is configured based on VLAN identifiers of users. Specifically, the delayed response time can be configured according to a range of VLAN identifiers of the user, and the delayed response time configured based on VLAN identifiers of users can be shown in Table 3.

TABLE 3

| MAC address modulo (remainder) | BNG A Delayed response time (ms) | BNG B Delayed response time (ms) | BNG C Delayed response time (ms) |
| --- | --- | --- | --- |
| VLAN 1-100 | 0 | 50 | 100 |
| VLAN 101-200 | 50 | 100 | 0 |
| VLAN 201-300 | 100 | 0 | 50 |

Embodiment 2

In this embodiment, specific steps for a BNG device in a BNG pool to respond to a user access request using a delayed response mechanism are as follows:

1) A user access port of the BNG device in the BNG pool is arranged in a layer 2 broadcast domain. The user access request received by the BNG device is broadcast, through the layer 2 broadcast domain, to all BNG devices in the BNG pool;

2) All BNG devices in the BNG pool configure statically a delayed response strategy for a user access request; after receiving a request message, each member in the BNG pool responds to the user access request according to its local delayed response strategy;

3) The user takes a BNG device who responds first to its request as a primary device, and response messages from other devices are dropped; and 4) After a failure occurs in the primary device, the user is notified through an aging mechanism to re-dial up, then steps 1) to 3) are repeated.

Embodiment 3

This embodiment introduces a process for configuring, based on a strategy server, a delayed response strategy for a BNG device in a BNG pool. The process is specifically described as follows:

1) The strategy server establishes a delayed response strategy according to a user access status of the BNG device in the BNG pool and/or a bandwidth utilization status, and this step specifically includes:

a) the strategy server acquires, according to a certain timing mechanism, the user access status and/or the bandwidth utilization status from each device in the BNG pool; each member in the BNG pool reports, according to a certain timing mechanism, its user access status and/or the bandwidth utilization status to the strategy sever; and b) the strategy server establishes the delayed response strategy according to a user access status of the BNG device in the BNG pool and/or a bandwidth utilization status; and 2) The strategy takes a characteristic value (e.g., MAC address, VLAN identifier, user identifier) of a user as a basis for establishing the delayed response strategy. The specific implementation is as same as that of embodiment 1.

It should be noted that the strategy server pushes, initiatively or upon requests by respective BNG devices for the delayed response strategy, delayed response strategies to respective BNG devices. The BNG device in the BNG pool responds to the user access request using a delayed response strategy configured by the strategy server.

What described are merely embodiments of the disclosure, and are not intended to limit the disclosure.

The invention claimed is:

1. A Broadband Network Gateway (BNG) pool based responding method, comprising:
   receiving, by a BNG device in the BNG pool, a user access request; and
   responding, by the BNG device, according to the user access request and a delayed response strategy corresponding to the BNG device;
   configuring initiatively or upon a request from the BNG device, by a strategy configuration device, the BNG device in the BNG pool with the delayed response strategy, wherein the delayed response strategy is determined based on at least one of following information: a user access status of the BNG device, a bandwidth utilization status, or a characteristic value of a user which requests access;
   wherein the responding, by the BNG device, according to the user access request and a delayed response strategy corresponding to the BNG device comprises:
   acquiring, by the BNG device according to the user access request, at least one of following information: an MAC address modulo result of the user, a range of VLAN identifiers of the user, or a domain where the user is located; and
   querying for, by the BNG device, the delayed response strategy according to acquired information, and responding according to a query result.

2. The method according to claim 1, wherein a user access port of the BNG device in the BNG pool is arranged in a layer 2 broadcast domain, and the user access request received by the BNG pool is broadcast, through the layer 2 broadcast domain, to all BNG devices in the BNG pool; and
   wherein the receiving, by a BNG device in the BNG pool, a user access request comprises: receiving a user access request broadcast by the BNG pool.

3. The method according to claim 1, wherein the characteristic value of the user which requests access comprises at least one of following information: a Media Access Control (MAC) address, a Virtual Local Area Network (VLAN) identifier or a user identifier.

4. The method according to claim 3, further comprising:
   determining, by a user equipment, a BNG device corresponding to a first response received as a server, and dropping responses from other BNG devices.

5. The method according to claim 1, further comprising:
   determining, by a user equipment, a BNG device corresponding to a first response received as a server, and dropping responses from other BNG devices.

6. The method according to claim 2, further comprising:
   determining, by a user equipment, a BNG device corresponding to a first response received as a server, and dropping responses from other BNG devices.

7. A Broadband Network Gateway (BNG) device, being a BNG device in a BNG pool, the BNG device comprising a first process configured to execute programmed instructions comprising:
   receiving a user access request;
   storing a delayed response strategy corresponding to the BNG device; and
   responding according to the user access request and the delayed response strategy corresponding to the BNG device;
   wherein the first processor configured to execute programmed instructions comprising: storing the delayed response strategy configured for the BNG device by a strategy configuration device initiatively or upon a request from the BNG device, wherein the delayed response strategy is determined based on at least one of following information: a user access status of the BNG device, a bandwidth utilization status, or a characteristic value of a user which requests access;
   wherein the responding according to the user access request and the delayed response strategy corresponding to the BNG device comprises:
   acquiring, according to the user access request, at least one of following information: a Media Access Control (MAC) address modulo result of the user, a range of VLAN identifiers of the user, or a domain where the user is located: and then querying for the delayed response strategy according to acquired information, and to respond according to a query result.

8. The BNG device according to claim 7, wherein the processor configured to execute programmed instructions comprising receiving the user access request broadcast by the BNG pool through a layer 2 broadcast domain.

9. A Broadband Network Gateway (BNG) pool based responding system, comprising: at least one BNG device, a strategy configuration device and a user equipment;
   wherein the BNG device comprises
   a first processor configured to execute programmed instructions:
   receiving a user access request; storing a delayed response strategy corresponding to the BNG device; and
   responding according to the user access request and the delayed response strategy corresponding to the BNG device;
   wherein the user equipment comprises
   a second processor configured to execute programmed instructions:
   transmitting the user access request to a BNG pool;
   receiving a response from the BNG device in the BNG pool; and
   determining a BNG device corresponding to a first response, and drop responses from other BNG devices; and
   configuring the BNG device with the delayed response strategy initiatively or upon a request from the BNG device, wherein the delayed response strategy is determined based on at least one of following information: a user access status of the BNG device, a bandwidth utilization status, or a characteristic value of a user which requests access;
   wherein the first processor further configured to execute programmed instructions comprising: storing the delayed response strategy configured for the BNG device by a strategy configuration device initiatively or upon a request from the BNG device, wherein the delayed response strategy is determined based on at least one of following information: a user access status of the BNG device, a bandwidth utilization status, or a characteristic value of a user which requests access;
wherein the responding according to the user access request and the delayed response strategy corresponding to the BNG device comprises:
acquiring, according to the user access request, at least one of following information: a Media Access Control (MAC) address modulo result of the user, a range of VLAN identifiers of the user, or a domain where the user is located: and then querying for the delayed response strategy according to acquired information, and to respond according to a query result.

10. The BNG pool based responding system according to claim 9, wherein the first processor further configured to execute programmed instructions: receive the user access request broadcast by the BNG pool through a layer 2 broadcast domain.

* * * * *